US006675259B2

(12) United States Patent
Gordon et al.

(10) Patent No.: US 6,675,259 B2
(45) Date of Patent: Jan. 6, 2004

(54) METHOD AND APPARATUS FOR VALIDATING AND RANKING DISK UNITS FOR SWITCHING

(75) Inventors: Sherry Lynn Gordon, Rochester, MN (US); Clinton Gene Laschkewitsch, Stewartville, MN (US); Michael James McDermott, Oronoco, MN (US); Amartey Scott Pearson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 09/915,907

(22) Filed: Jul. 26, 2001

(65) Prior Publication Data

US 2003/0023810 A1 Jan. 30, 2003

(51) Int. Cl.[7] .............................................. G06F 12/00
(52) U.S. Cl. ...................................................... 711/114
(58) Field of Search .......................... 711/111, 112, 114

(56) References Cited

U.S. PATENT DOCUMENTS

| 5,937,189 | A | | 8/1999 | Branson et al. ............. 395/701 |
|---|---|---|---|---|
| 5,983,316 | A | * | 11/1999 | Norwood ..................... 711/112 |
| 6,260,125 | B1 | * | 7/2001 | McDowell .................... 711/162 |
| 6,389,459 | B1 | * | 5/2002 | McDowell .................... 709/216 |
| 6,493,804 | B1 | * | 12/2002 | Soltis et al. .................. 711/152 |
| 2002/0016827 | A1 | * | 2/2002 | McCabe et al. ............. 709/213 |
| 2002/0073278 | A1 | * | 6/2002 | McDowell .................... 711/114 |
| 2003/0005202 | A1 | * | 1/2003 | Bakke et al. ................ 710/305 |

* cited by examiner

*Primary Examiner*—Kevin Verbrugge
(74) *Attorney, Agent, or Firm*—Moser, Patterson & Sheridan, LLP

(57) ABSTRACT

Method and apparatus for ensuring availability of disk units in a disk pool which may be switched between a primary system and one or more backup systems. One embodiment provides a method for ensuring accessibility of one or more disk units by a system, comprising: configuring a storage pool for the system; validating availability of the one or more disk units for the storage pool; and selecting one or more valid disk units for the storage pool. The method may further comprise ranking availability of each disk unit for the storage pool and selecting one or more valid disk units for the storage pool according to availability ranking.

25 Claims, 7 Drawing Sheets

METHOD AND APPARATUS FOR VALIDATING AND RANKING DISK UNITS FOR SWITCHING

BACKGROUND OF THE INVENTION

1. Field of the Invention

The present invention generally relates to disk units for storage pools. More particularly, the present invention relates to configuration and accessibility of disk units for switchable storage pools.

2. Description of the Related Art

In this new era of electronic commerce, server/systems must be continuously available to the thousands of unknown and unforgiving Internet users. Even short periods of server/system unavailability give potential customers the excuse to point and click elsewhere. In the past, most disaster recovery focused on unscheduled downtime due to, for example, power outages, natural disasters, site disasters, system hardware or software errors, application malfunctions and deliberate acts of sabotage. Typically, the solution to unscheduled downtime is to stop the business and utilize backup systems from a remote recovery site. The business interruption may be many hours or even days.

The emerging requirement in electronic commerce businesses today is continuous system availability and protection from scheduled downtimes. Scheduled downtimes are becoming more problematic than the remote chance of a disaster. During a scheduled downtime or outage, the system (e.g., server) is deliberately made unavailable to users (e.g., client). Examples of scheduled downtime/outages include, installation of new operating system or application software releases, system hardware upgrades, additions, removals, and maintenance, system backups or saves, site maintenance, and application of program temporary fixes (PTFs). A system that is set to have "continuous availability" is defined as a system having no scheduled or unscheduled outages.

One method for improving and enhancing system availability utilizes a clustered system. A cluster is a collection of complete systems that cooperate and interoperate to provide a single, unified computing capability. A clustered system provides failover and switchover capabilities for systems that are used as database servers or application servers. If a system outage or a site loss occurs, the functions that are provided on a clustered primary server system can be switched over (or failed over) to one or more designated backup systems that contain a current copy (replica) of the resources. The failover can be automatic for unscheduled outages. For scheduled outages, a switchover may be scheduled with the scheduled outage or manually initiated.

In the event of a failover or a switchover, Cluster Resource Services (CRS), which may be part of the server operating system and running on all systems, provides a switchover from the primary system to the backup system. This switchover causes minimal impact to the end user or applications that are running on a server system. Data requests are automatically rerouted to the backup (i.e., new primary) system. Cluster Resource Services also provides the means to automatically re-introduce or rejoin systems to the cluster, and restore the operational capabilities of the rejoined systems.

Data may be stored in disk pools connected to one or more server systems. A disk pool is a set of disk units, such as a tower of disk units and a redundant array of independent disks (RAID). A disk pool is switched from a primary system to a backup system by switching ownership of the hardware entity containing the disk units of the disk pool from the primary system to the backup system. However, the disk units in the disk pool must be physically located in correct hardware entities (e.g., a tower which the primary and backup systems can access), and must follow many configuration and hardware placement rules. A user must follow these configuration and hardware placement rules when selecting disk units for the disk pool and when selecting primary and backup systems for accessing the disk pool. Otherwise, the disk pool may not be available for the primary system and/or the backup system when a switchover is attempted or when a failover occurs. The user must also follow these rules when changing the hardware configuration. The user has the responsibility to understand and follow the configuration and hardware placement rules to correctly configure the disk units and the cluster system. However, due to the complexity of the configuration and hardware placement rules, the user may be forced into a trial and error situation, resulting in unavailable disk units when a switchover occurs.

Therefore, there is a need for a system and method for ensuring that a set of disks (i.e., a disk pool) are accessible to a primary system and one or more backup systems for the disk pool. Furthermore, there is a need for ensuring that valid disk units are selected for configuration in a disk pool.

SUMMARY OF THE INVENTION

Embodiments of the invention generally provide methods and apparatuses for ensuring that a set of disks (i.e., a disk pool) are accessible to a primary system and one or more backup systems for the disk pool. Also, embodiments of the invention provide methods and apparatuses for ensuring that valid disk units are selected for configuration in a disk pool.

One embodiment provides a method for ensuring accessibility of one or more disk units by a system, comprising: configuring a storage pool for the system; validating availability of the one or more disk units for the storage pool; and selecting one or more valid disk units for the storage pool. The method may further comprise ranking availability of each disk unit for the storage pool and selecting one or more valid disk units for the storage pool according to availability ranking. Another embodiment provides a signal bearing medium, comprising a program which, when executed by a processor, implements the foregoing method.

In another embodiment, the method further comprises validating accessibility of disk units in the storage pool when adding a node to a clustered system. In yet another embodiment, when adding a switchable storage pool to the clustered system, the method further comprises verifying accessibility of each disk units in a switchable storage pool by one or more nodes in the clustered system. In yet another embodiment, the method further comprises verifying that a switchable entity containing the switchable storage pool is not included in another clustered system. In yet another embodiment, the method further comprises validating switchability of the switchable storage pool when starting clustering.

Yet another embodiment provides a system, comprising: a primary system; a storage pool connected to the primary system; and a processor configured to validate availability of one or more disk units for the storage pool and select one or more valid disk units for the storage pool. The processor may be further configured to rank availability of each disk unit for the storage pool and select one or more valid disk units for the storage pool according to availability ranking. The system may be a clustered system, and the storage pool may be a switchable storage pool.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
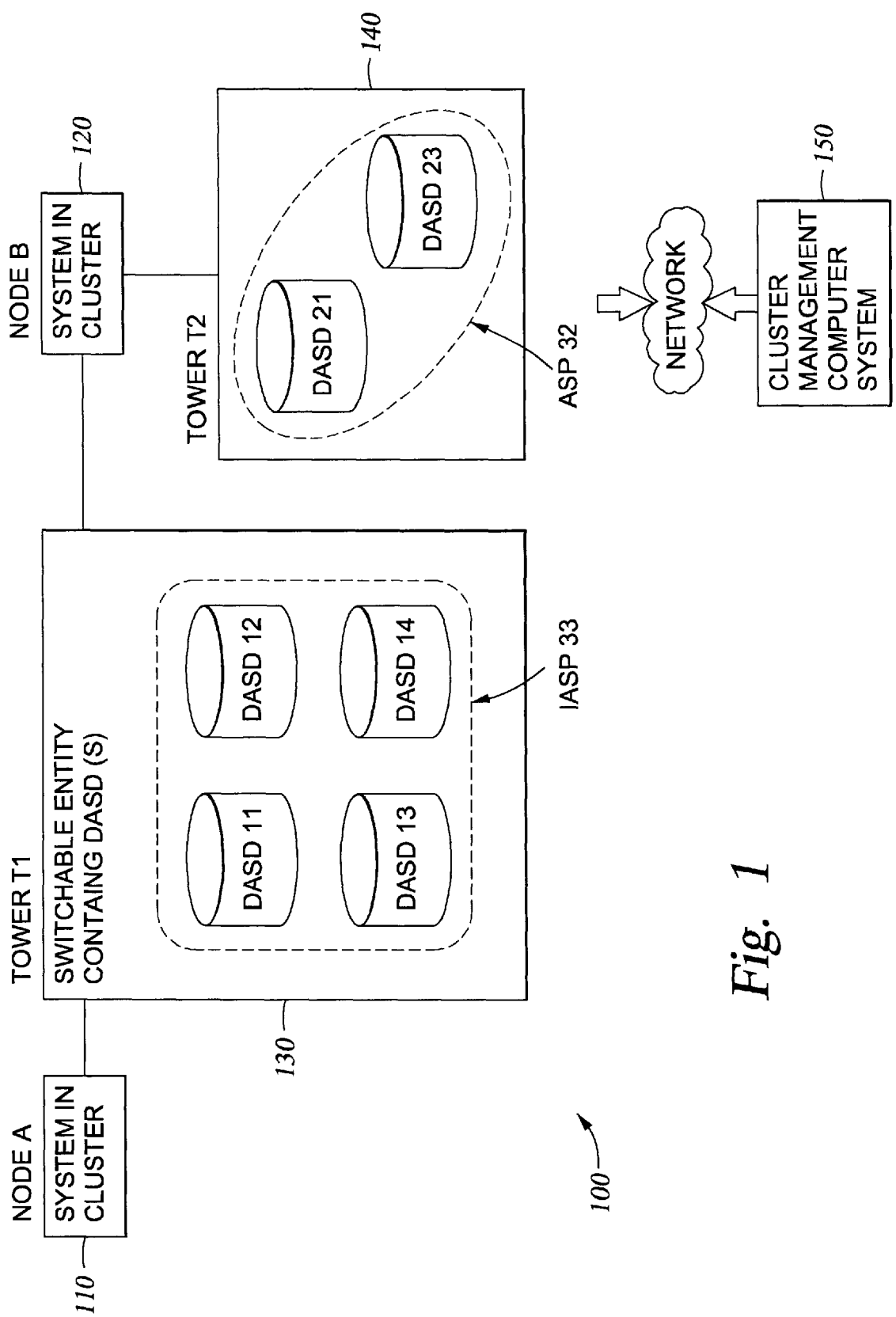
FIG. 1 illustrates one embodiment of a clustered computing environment 100.

Generally, embodiments of the invention provide systems and methods for ensuring availability of disk units in a disk pool which may be switched between a primary system and one or more backup systems. The primary system, the backup system(s) and one or more disk pools may be configured in a cluster to provide continuous availability. A cluster is defined as a group of systems or nodes that work together as a single system. Each system in the cluster is called a cluster node. A set of interfaces is provided for creating, adding, changing, and deleting nodes in a cluster.

In one embodiment, a mechanism is provided for validating and ranking one or more disk unit for a specified disk pool. In another embodiment, a mechanism is provided for validating accessibility of disk units in a disk pool for a system before configuring the system as a primary system or as backup system for accessing the disk pool. In yet another embodiment, a mechanism is provided for validating disk units in a switchable disk pool when clustering is started in preparation for activating a switchover between a primary system and a backup system.

Embodiments of the invention can be implemented as a program product for use with a computer system such as, for example, the cluster computing environment shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In one embodiment, the mechanisms of the present invention are incorporated and used in a clustered computing environment. FIG. 1 illustrates one embodiment of a clustered computing environment 100. As shown in the exemplar cluster in FIG. 1, the clustered computing environment 100 includes a first system 110 (node A), a second system 120 (node B), a first tower 130 of disk units (Tower T1), and a second tower 140 of disk units (Tower T2). The first system 110 and the second system 120 may each comprise a computer system such as the computer system 200 described below in FIG. 2. Cluster management operations may be performed utilizing operating systems in the first system 110 or the second system 120. Optionally, the clustered computing environment 100 may also include a cluster management computer system 150 which may be dedicated for performing operations related to configuration, changes, maintenance, and other tasks for the clustered computing environment 100. The cluster management computer system 150 may be connected to the other components of the cluster computing environment 100 through a network and may also comprise a computer system such as the computer system 200 described below in FIG. 2.

Referring still to FIG. 1, the first and second towers (130 and 140) of disk units may each comprise a plurality of disk units, such as a plurality of direct access storage disks (DASDs). As shown in FIG. 1, the first tower 130 includes DASD 11, DASD 12, DASD 13 and DASD 14, which may be proposed to be defined together as an independent auxiliary storage pool (IASP) 33, and the second tower 140 includes DASD 21 and DASD 22, which may be proposed to be defined together as an auxiliary storage pool (ASP) 32. The first tower 130 is connected to both the first system 110 and the second system 120. The second tower 140 is connected to the second system 120. In one embodiment, the first system 110 is configured as the primary system for IASP 33 in the first tower 130, and the second system 120 is configured as the backup system for IASP 33 (i.e., becomes new primary system for IASP 33 when first system 110 becomes unavailable because of a scheduled or unscheduled outage).

Figure 2:
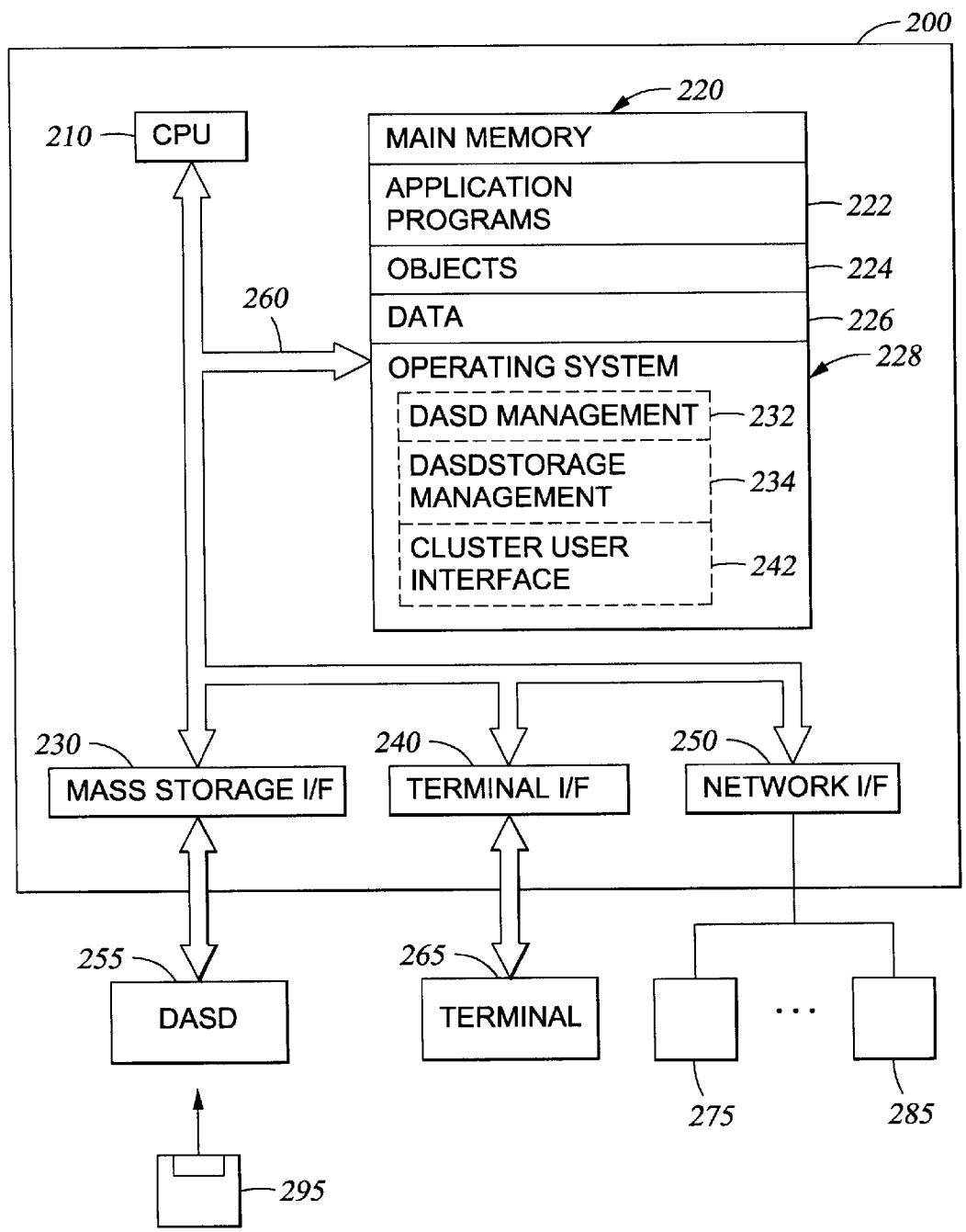
FIG. 2 illustrates a block diagram of a computer system 200.

FIG. 2 illustrates a block diagram of a computer system 200. A commercially available example of the computer system includes the IBM eServer iSeries server system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 2, computer system 200 comprises main or central processing unit (CPU) 210 connected to main memory 220, mass storage interface 230, terminal interface 240, and network interface 250. These system components are interconnected through the use of a system bus 260. Mass storage interface 230 is used to connect mass storage devices (such as DASD device 255) to computer system 200. One specific type of DASD device is a floppy disk drive, which may store data to and read data from a floppy diskette 295.

Main memory 220 contains application programs 222, objects 224, data 226, and an operating system 228. While application programs 222, objects 224, and operating system 228 are shown to reside in main memory 220, those skilled in the art will recognize that these programs are not necessarily all completely contained in main memory 220 at the same time. Computer system 200 utilizes well known virtual addressing mechanisms that allow the programs of computer system 200 to behave as if they only have access to a large, single storage entity (referred to herein as computer system memory) instead of access to multiple, smaller storage entities such as main memory 220 and DASD device 255. Note that the term "computer system memory" is used herein to generically refer to the entire virtual memory of computer system 200.

Operating system 228 is a suitable multitasking operating system such as the IBM OS/400 operating system; however, those skilled in the art will appreciate that the spirit and scope of the present invention is not limited to any one operating system. Operating system 228 may support an object oriented programming environment such as that provided, for example, by the C++ programming language. Operating system 228 includes a DASD Management user interface program 232, a DASD Storage Management program 234 and a cluster user interface program 242. In one embodiment, each program 232, 234, and 242 may comprise an object oriented framework mechanism containing instructions capable of being executed on CPU 210 and may exist anywhere in the virtual memory space of computer 200.

Although computer system 200 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 210. However, those skilled in the art will appreciate that the present invention applies equally to computer systems that simply use I/O adapters to perform similar functions. Furthermore, those skilled in the art will appreciate that the present invention applies equally to computer systems that utilize logical partitioning (e.g., LPAR) which divides (i.e., partitions) one computer system into a plurality of independent computer systems.

Terminal interface 240 is used to directly connect one or more terminals 265 to computer system 200. These terminals 265, which may be non-intelligent or fully programmable workstations, are used to allow system administrators and users to communicate with computer system 200.

Network interface 250 is used to connect other computer systems and/or workstations (e.g., 275 and 285 in FIG. 2) to computer system 200 in networked fashion. The present invention applies equally no matter how computer system 200 may be connected to other computer systems and/or workstations, regardless of whether the connection to the network is made using present-day analog and/or digital techniques or via some networking mechanism of the future. It is also important to point out that the presence of network interface 250 within computer system 200 means that computer system 200 may engage in cooperative processing with one or more other computer systems or workstations. Of course, this in turn means that the programs shown in main memory 220 need not necessarily all reside on computer system 200. For example, one or more application programs 222 may reside on another system and engage in cooperative processing with one or more programs that reside on computer system 200. This cooperative processing could be accomplished through use of one of the well known client-server mechanisms such as remote procedure calls (RPC). In one embodiment, cooperative processing may be accomplished by exchanging messages over a communication network running TCP/IP (Transmission Control Protocol/Internet Protocol), which is a set of communications protocols that support peer-to-peer connectivity functions for both local and wide area networks.

At this point, it is important to note that while embodiments of the present invention have been (and will continue to be) described in the context of a fully functional computer system, those skilled in the art will appreciate that embodiments are capable of being distributed as a program product via floppy disk (e.g., 295 of FIG. 2), CD ROM, or other form of recordable media, or via any type of electronic transmission mechanism.

In one embodiment, the operating system 228 of the computer system 200 includes a DASD Management user interface program 232 which performs functions related to configuration, operation and other management functions, including functions for selecting one or more DASDs for an auxiliary storage pool (ASP). An ASP is defined as a set of disk units, and an independent auxiliary storage pool (IASP) is a set of disk units independent of a system. An IASP can be switched between systems, if its disk units are switchable and follow configuration and placement rules. DASD Management user interface program 232 may communicate with DASD Storage Management (DSM) program 234, which is a component of operating system that provides internal support for managing disk units.

Figure 3:
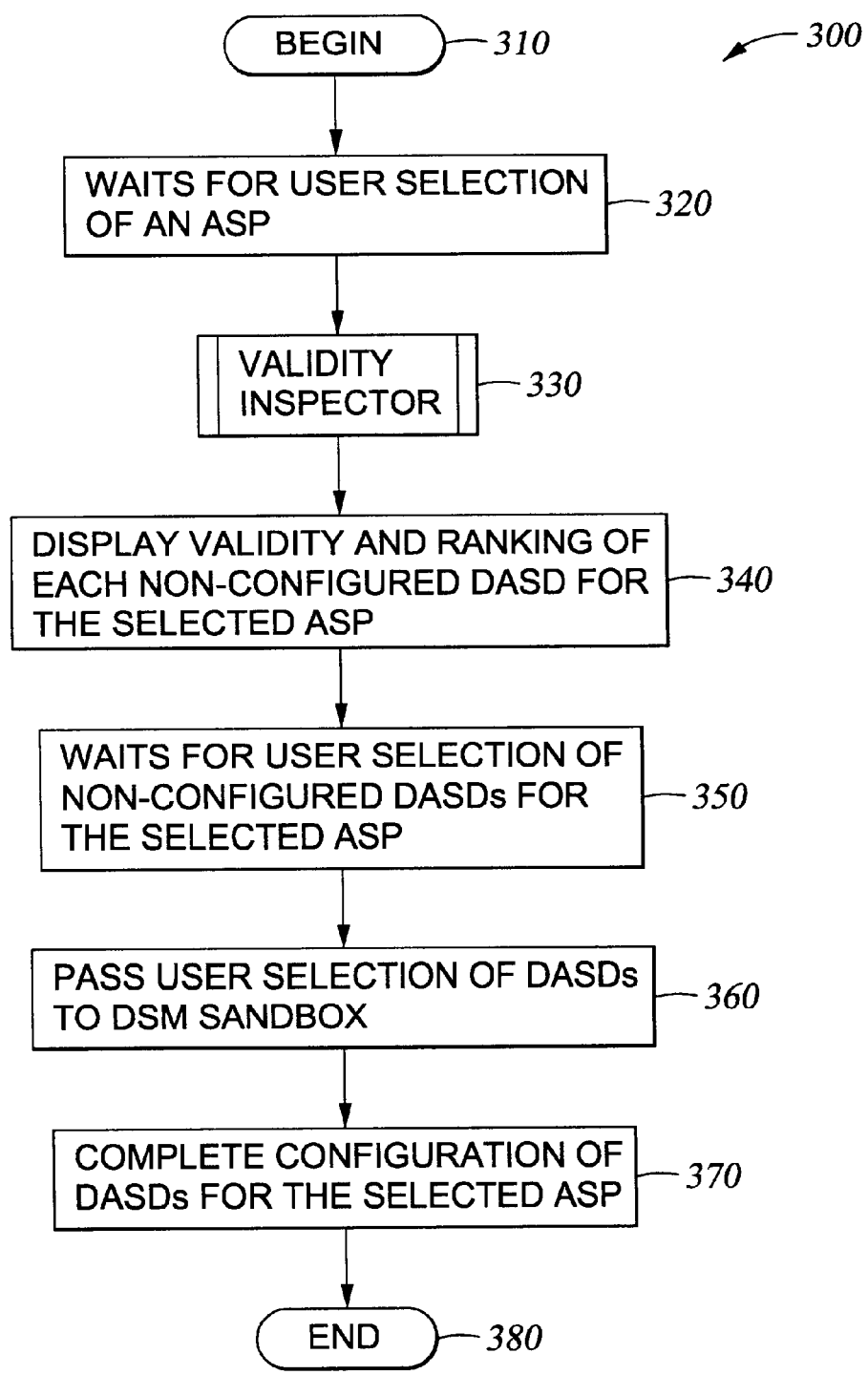
FIG. 3 is a flow diagram illustrating one embodiment of a method 300 for selecting one or more disk units for a disk pool.

FIG. 3 is a flow diagram illustrating one embodiment of a method 300 for selecting one or more DASDs for an ASP. In one embodiment, the method 300 may be understood as illustrating a portion of the DASD Management user interface program 232 as related to selection of one or more DASDs for an ASP connected to a system. The method 300 begins at step 310 and waits at step 320 for user selection of an ASP for which one or more DASDs is to be configured. The user may select an existing ASP or a new ASP. In one embodiment, multiple DASDs and ASPs may be selected and processed in parallel. Once the user has entered the ASP selection, a validity inspector is invoked to provide validity and ranking results of all non-configured DASDs at step 330. Details of the validity inspector are described below. The results of the validity inspector, including the validity and ranking of each non-configured DASD for the selected ASP, are displayed to the user at step 340.

In one embodiment, the validity inspector checks the following rules to determine validity when selecting disk units for a disk pool or when selecting primary and backup systems. It is understood that the following rules are exemplary and that other sets of rules may be followed for other systems. First, disk units in different disk pools that are separately switchable cannot be in the same switchable entity. For example, separately switchable disk pools cannot have disk units located in the same tower. Second, disk units that are not going to be switched cannot be in a switchable hardware entity that contains disk units for disk pools that will be switched. For example, disk units that stay with a system (e.g., a system ASP, ASP 32 in FIG. 1) cannot be in the same tower with disk units in a switchable disk pool. Third, disk units in a switchable disk pool to be switched between specific systems must be in hardware entities that those specific systems can access. For example, disk units intended to be switched to a backup system cannot be in a tower which the backup system cannot access. Fourth, disk units in the same disk pool must be under hardware entities in the same power domain (i.e., switched on/off together). Other rules, such as rules regarding system constraints, may also be utilized to determine validity of the DASD selections.

In one embodiment, the valid DASDs are displayed in ranked order. The output of the validity inspector may be one of the following: perfect, valid, warning, invalid and invalid request. The output "perfect" indicates that the selected DASD is the best DASD for the specified ASP. The output "valid" indicates that the DASD does not have the best ranking, but the DASD may be put in the ASP. The output "warning" indicates that the DASD may be invalid or questionable for the specified ASP. The output "Invalid" indicates that the DASD is not allowed to be put in the specified ASP. Details regarding the rankings of the selected DASD and the other non-configured DASDs may be obtained from a LdValidityForAsp object (i.e., LdValidityForAsp object 502 discussed below). The output "invalid request" indicates that one or more of the input parameters for the validity inspector are invalid.

In one embodiment, the following factors are utilized for ranking the valid DASD selections. First, disk units for one disk pool are preferably kept under the same switchable hardware entity. Second, the primary and/or backup system preferably have direct access to the switchable hardware entity (i.e., without other entities in between). Third, disk units for one disk pool are preferably contained in one switchable hardware entity (i.e., the switchable hardware entity does not contain more than one IASP). It is understood that the above factors are exemplary and that other sets of factors may be utilized for other systems.

In another embodiment, the invalid DASDs may be displayed in addition to the valid DASDs. However, method 300 does not allow user selection of the invalid DASDs to be configured for the selected ASP. In another embodiment, each invalid DASD is displayed with one or more reasons for the invalid DASD being an inappropriate selection for the selected ASP. For example, besides switchability reasons, the invalid DASDs may be invalid because of capacity, protection, or other system rule violation. The user may change invalid DASDs to become valid DASDs (e.g., through physical movement of the DASD to an appropriate place) according to the invalidity reason.

At step 350, the method 300 waits for the user to select one or more valid non-configured DASDs in ranking order for the ASP. At step 360, the method 300 passes the DASD selections to a DSM sandbox, an object for holding parameters for DASD Storage Management program 234. Configuration of the selected valid DASDs for the ASP (or IASP) may be completed as known in the art at step 370, and the method 300 ends at step 380.

Figure 4:
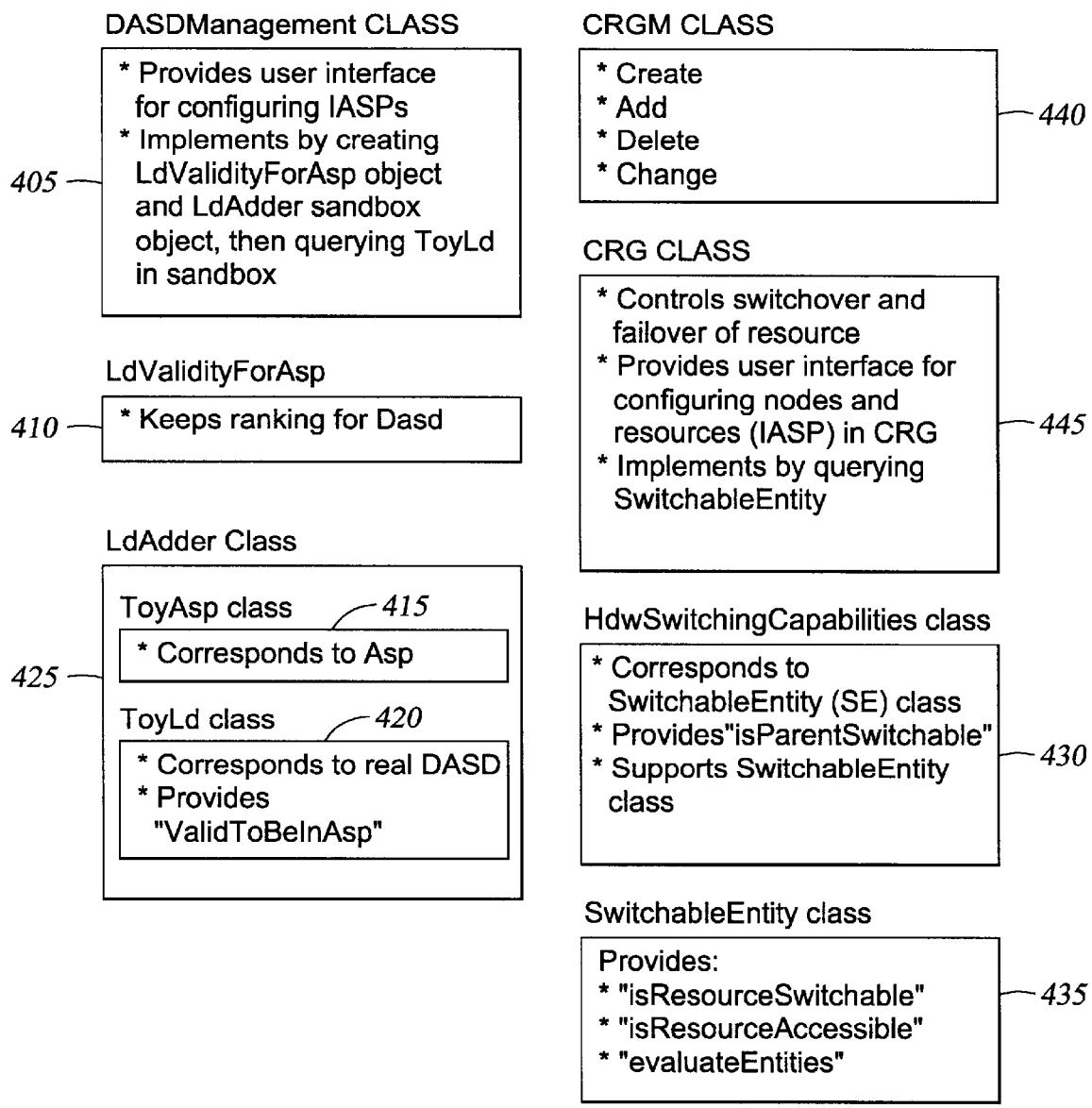
FIG. 4 illustrates one embodiment of software classes and responsibilities of each software class.

In one embodiment, the method 300 may be implemented utilizing object oriented programming. FIG. 4 illustrates one embodiment of software classes and responsibilities of each software class. The related objects and methods of the classes are described in more detail below with reference to FIGS. 5 and 7. As shown in FIG. 4, the software classes include a DASD Management (DM) class 405, a LdValidityForAsp class 410, a ToyAsp class 415, a ToyLd class 420, a HdwSwitchingCapabilities class 430, a SwitchableEntity class 435, a CRGM (Cluster Resource Group Management) class 440, and a CRG (Cluster Resource Group) class 445.

The DASD Management (DM) class 405 provides a user interface for configuring IASPs. In one embodiment, the DASD Management (DM) class 405 implements an IASP configuration by creating a LdValidityForAsp object and a LdAdder sandbox object and then querying each object (herein referred to as "ToyLd") in the sandbox. The LdValidityForAsp (i.e., Logical DASD Validity For ASP) class 410 keeps the results of the validity and ranking for the non-configured DASDs in the LdValidityForAsp object. The LdAdder (i.e., Logical DASD Adder) class 425 provides for selection of proposed DASDs and ASPs. Illustratively, the LdAdder class 425 comprises a ToyAsp (i.e., Toy ASP) class 415 representing the selected ASPs and a ToyLd (i.e., Toy Logical DASD) class 420 representing non-configured DASDs. The HdwSwitchingCapabilities (i.e., Hardware Switching Capabilities) class 430 provides functions/methods for determining switchability of the tower where the DASDs are physically located. In one embodiment, the HdwSwitchingCapabilities class 430 provides an isParentSwitchable method and supports the SwitchableEntity class 435. The isParentSwitchable method determines whether the entity containing the disk unit is switchable. The SwitchableEntity class 435 provides functions/methods for evaluating switchability, including an isResourceSwitchable function, an isResourceAccessible function and an evaluateEntities function. The isResourceSwitchable function determines whether the IASP is defined in a cluster resource group (CRG). The isResourceAccessible function determines whether nodes in a CRG recovery domain (i.e., primary and backup systems) can access the resource. The evaluateEntities function determines whether the entities are in the same CRG. The CRGM (i.e., Cluster Resource Group Management) class 440 includes functions/support for creating, adding, changing, deleting and other operations relating to management of cluster resource groups. The CRG (i.e., Cluster Resource Group) class 445 controls switchover and failover of resources (e.g., IASPs) and provides user interface for configuring nodes and resources in CRG. In one embodiment, implementation of operations of the CRG class 445 includes queries utilizing functions provided in the SwitchableEntity class 435.

Figure 5:
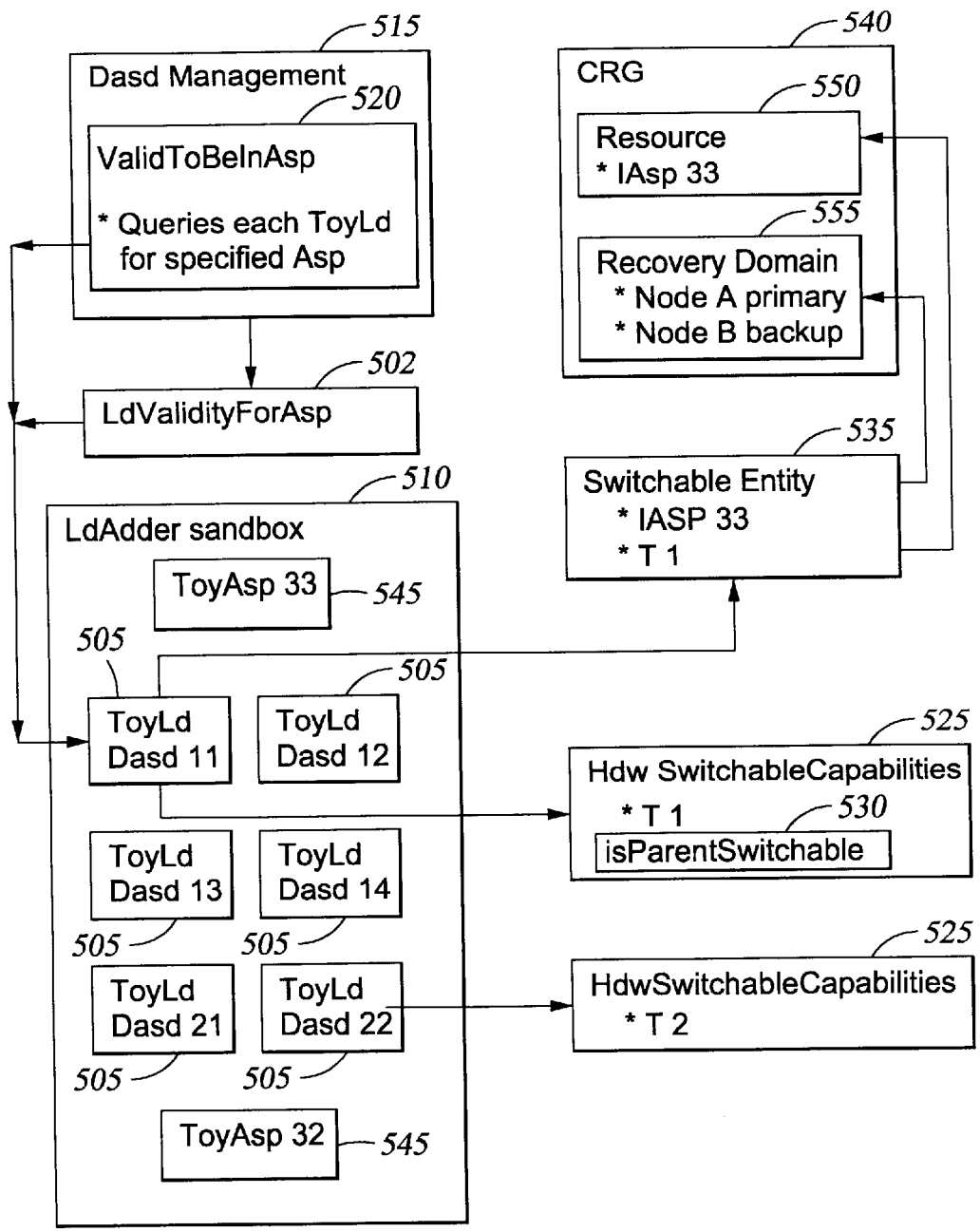
FIG. 5 illustrates one embodiment of software objects which may be utilized for implementing the validity inspector 330 in FIG. 3.
Figure 6:
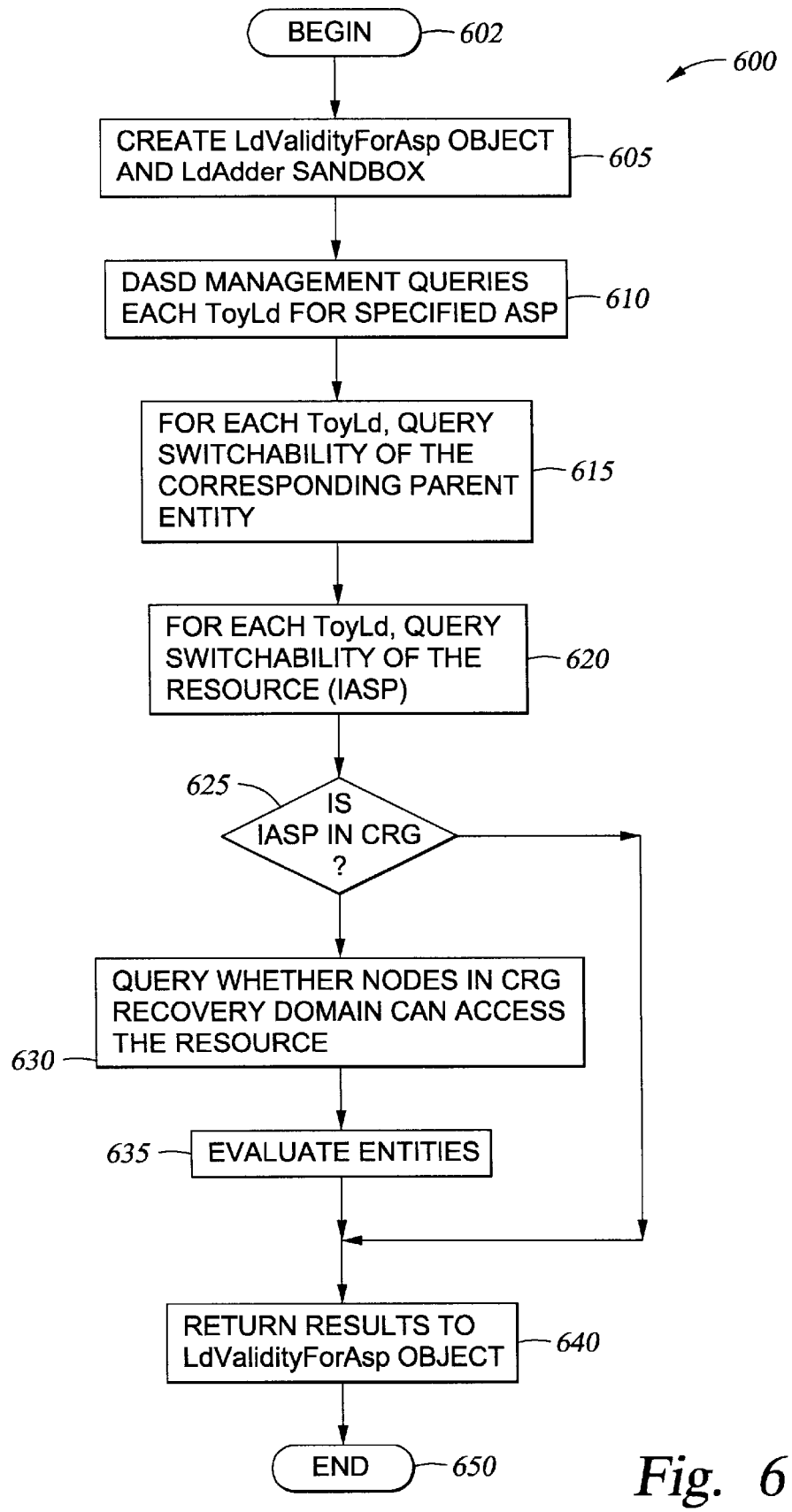
FIG. 6 is a flow diagram illustrating one embodiment of a method 600 for validating and ranking disk units for a selected disk pool.

FIG. 5 illustrates one embodiment of software objects which may be utilized for implementing the validity inspector at step 330 of FIG. 3. FIG. 6 is a flow diagram illustrating one embodiment of a method 600 for validating and ranking non-configured DASDs for a selected ASP. The method 600 may be understood as an implementation of the validity inspector at step 330 of FIG. 3, which is discussed below referring to both FIGS. 5 and 6. The method 600 begins at step 602 and proceeds to step 605 to create a LdValidityForAsp object 502 and a LdAdder sandbox 510. The LdValidityForAsp object 502 holds the switchability results including the validity and ranking of the non-configured DASDs. The LdAdder sandbox 510 holds proposed ASP objects 545 (e.g., ToyAsp 32 and 33 which, when configured, correspond to ASP 32 and IASP 33 of FIG. 1, respectively) and the software equivalent objects of the hardware DASDs (e.g., ToyLd 505, one ToyLd for each DASD, including DASD 11, 12, 13, 14, 21 and 22 as shown). At step 610, the method 600 queries each ToyLd 505 (i.e., each non-configured DASDs) in the LdAdder sandbox 510 for its configuration into the specified ASP. The queries are invoked by DASD Management 515 via validToBeInAsp function 520 on each ToyLd object 505. At step 615, each ToyLd 505 then queries its corresponding HdwSwitchingCapabilities object 525 which provides the switching capabilities of the hardware entity (e.g., parent entity) physically containing the DASD corresponding to the ToyLd 505. The switching capabilities of the hardware entity is provided through a isParentSwitchable function 530.

Then at step 620, the method 600 queries the SwitchabilityEntity object 535 to determine whether the resource (i.e., the disk pool containing the DASD corresponding to the ToyLd being processed) is switchable. The SwitchableEntity object 535 queries the CRG object 540 to determine whether the resource (e.g., ToyAsp 33) is defined in a CRG. For example, for ToyLd DASD 11, the SwitchableEntity object 535 determines whether the resource ToyAsp 33 is defined in a CRG as a switchable IASP (e.g., Resource 550). Next, at step 625, if the resource is switchable (i.e., if the resource is an IASP defined in a CRG), the method proceeds to perform additional queries at step 630 and 635. At step 630, the method 600 queries whether nodes in the CRG recovery domain 555 (i.e., primary system and backup system) can access the resource, and at step 635, the method 600 evaluates whether the entities (e.g., the resource and the node systems) are defined in the same CRG. Then at step 640, the switchability results of the non-configured DASDs are returned to the LdValidityForAsp object 502. Referring back to step 625, if the resource is not switchable, then the method 600 proceeds to step 640 and returns the switchability results of the non-configured DASDs to the LdValidityForAsp object 502. The method 600 then ends at step 650.

Figure 7:
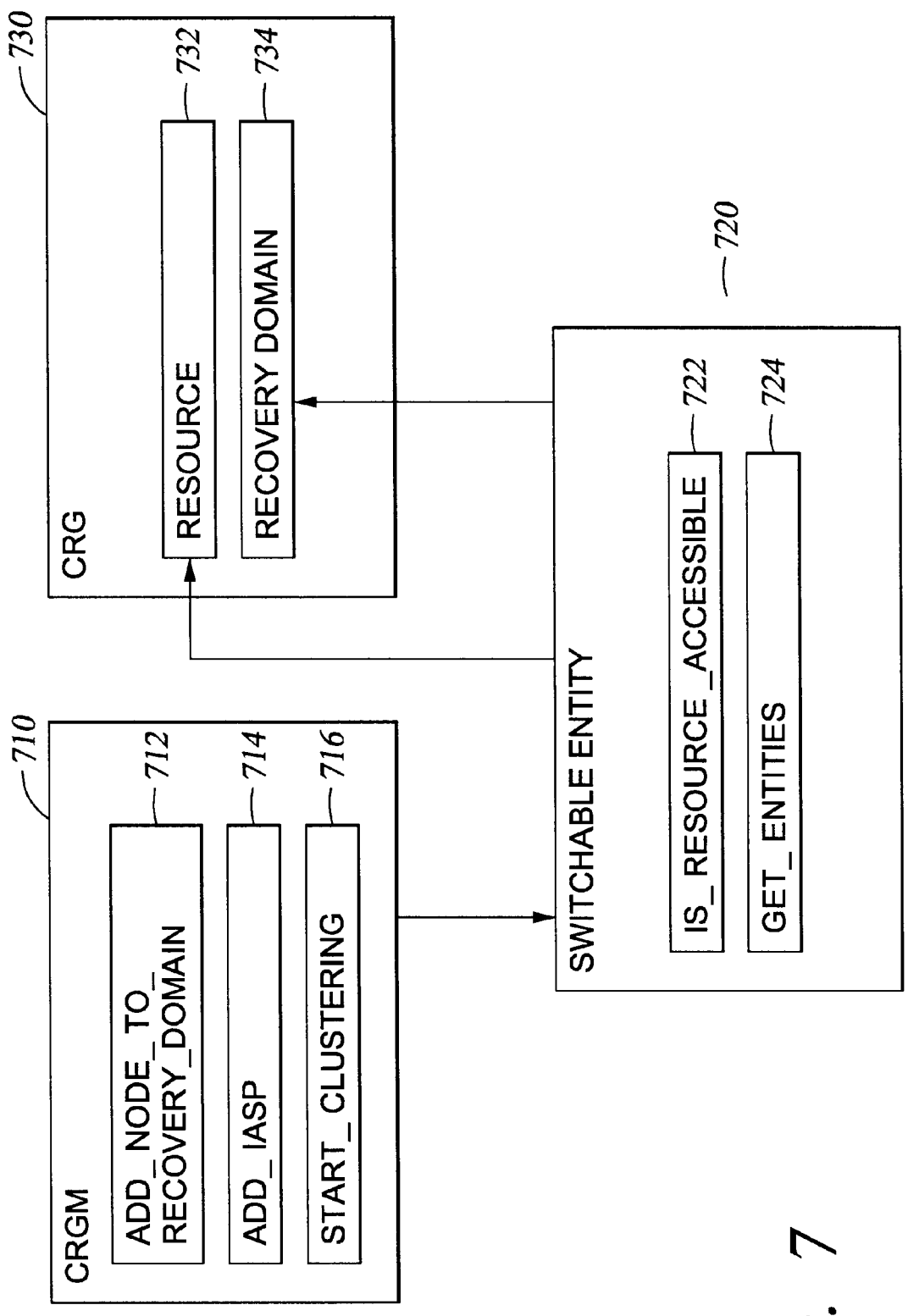
FIG. 7 illustrates one embodiment of software objects utilized for checking switchability of disk pools for clustering operations.

In another embodiment, the operating system 228 of the computer system 200 also includes a cluster user interface program 242 for clustering two or more computer systems in a cluster. The validity inspector may also be invoked to perform certain operations of the cluster user interface program 245. FIG. 7 illustrates one embodiment of software objects utilized for checking switchability of IASPs for clustering operations. Generally, in each of the following embodiments, the CRGM object 710 invokes one or more functions in the SwitchableEntity object 720, which validates the clustering operation through the CRG object 730.

In one embodiment, when adding a node to a CRG's recovery domain, the CRGM checks whether the proposed new node has access to the DASDs in the IASP(s). Referring to FIG. 7, the CRGM add_node_to_recovery_domain function 712 invokes the isResourceAccessible function 722 and passes parameters including the proposed new node and the existing IASP(s). The isResourceAccessible function 722 checks the IASPs in the Resource object 732 and the nodes in the RecoveryDomain object 734 and determines whether the proposed new node has access to the DASDs in the IASP. If the proposed new node can access the DASDs in the IASP, the user is allowed to complete the CRGM operation. If the proposed new node does not have access to the DASDs in the IASP, an error warning is displayed to the user configuring the proposed new node.

In another embodiment, when adding an IASP to the CRG, the CRGM checks whether all nodes in the recovery domain have access to the DASDs in the IASP to be added. Referring to FIG. 7, the CRGM add_iasp function 714 invokes the isResourceAccessible function 722 and passes parameters including the proposed new IASP and the existing nodes in the recovery domain. The isResourceAccessible function 722 checks the IASPs in the Resource object 732 and the nodes in the RecoveryDomain object 734 and determines whether all nodes in the recovery domain have access to the DASDs in the IASP to be added. If so, the user is allowed to complete the CRGM operation. If not, an error warning is displayed to the user configuring the proposed new IASP.

When adding an IASP to the CRG, the CRGM may also check whether any other CRG has the same switchable entity (e.g., switchable tower) containing the IASP. The CRGM add_iasp function 714 invokes getEntities function 724 to retrieve the SwitchableEntity(s) for the proposed new IASP. The CRGM then searches other existing CRGs to determine whether any other CRG has the same switchable entity. If no other CRG has the same switchable entity, the user is allowed to complete the CRGM operation. If another CRG has the same switchable entity, an error warning is displayed to the user adding the proposed IASP to the CRG.

In another embodiment, when starting the IASP's CRG (i.e., starting clustering), the CRGM validates the IASP's switchability. This additional validation serves to detect potential switchability errors due to hardware relocation (e.g., movement of cables and disk units). This additional validation may also detect errors due to improper DASD configuration (e.g., when the user configures a DASD when clustering was not active and the user ignores configuration warnings). The CRGM start_clustering function 716 invokes the isResourceAccessible function 722 and passes parameters including the existing IASP(s) in the Resource object 732. The isResourceAccessible function 722 checks the IASPs in the Resource object 732 and the nodes in the RecoveryDomain object 734 and determines whether all nodes in the recovery domain have access to the DASDs in the IASP. If so, the user is allowed to complete the CRGM start_clustering function. If not, an error warning is displayed to the user attempting the clustering operation.

While the foregoing is directed to embodiments of the present invention, other and further embodiments of the invention may be devised without departing from the basic scope thereof, and the scope thereof is determined by the claims that follow.

What is claimed is:

1. A method for ensuring accessibility of one or more disk units by a system, comprising:

configuring a storage pool for the system;

validating availability of the one or more disk units for the storage pool;

selecting one or more valid disk units for the storage pool;

ranking availability of each disk unit for the storage pool; and selecting one or more valid disk units for the storage pool according to availability ranking.

2. The method of claim 1, further comprising, providing one or more reasons to a user to explain validity and ranking of each disk unit.

3. The method of claim 1, wherein the system comprises a clustered system.

4. The method of claim 3, wherein the clustered system comprises a primary system and one or more backup systems.

5. The method of claim 3, further comprising: validating accessibility of disk units in the storage pool when adding a node to the clustered system.

6. The method of claim 3, further comprising: when adding a switchable storage pool to the clustered system, verifying accessibility of each disk unit in the switchable storage pool by each node in the clustered system.

7. The method of claim 6, further comprising: verifying that a switchable entity containing the switchable storage pool is not included in another clustered system.

8. The method of claim 3, further comprising: validating switchability of the switchable storage pool when starting clustering.

9. The method of claim 1, further comprising configuring the storage pool as a switchable storage pool.

10. A signal bearing medium, comprising a program which, when executed by a processor, performs operations for ensuring accessibility of one or more disk units by a system, the operations comprising:

configuring a storage pool for the system;

validating availability of the one or more disk units for the storage pool; and selecting one or more valid disk units for the storage pool;

ranking availability of each disk unit for the storage pool; and selecting one or more valid disk units for the storage pool according to availability ranking.

11. The signal bearing medium of claim 10, wherein the operations further comprise:

providing one or more reasons to a user to explain validity and ranking of each disk unit.

12. The signal bearing medium of claim 10, wherein the system comprises a clustered system.

13. The signal bearing medium of claim 12, wherein the operations further comprise:

validating accessibility of disk units in the storage pool when adding a node to the clustered system.

14. The signal bearing medium of claim 12, wherein the operations further comprise:

when adding a switchable storage pool to the clustered system, verifying accessibility of each disk unit in the switchable storage pool by each node in the clustered system.

15. The signal bearing medium of claim 14, wherein the operations further comprise:

verifying that a switchable entity containing the switchable storage pool is not included in another clustered system.

16. The signal bearing medium of claim 12, wherein the operations further comprise:

validating switchability of the switchable storage pool when starting clustering.

17. The signal bearing medium of claim 10, wherein the operations further comprise configuring the storage pool as a switchable storage pool.

18. A system, comprising:

a primary system;

a storage pool connected to the primary system; and a processor configured to:

validate availability of one or more disk units for the storage pool;

select one or more valid disk units for the storage pool; and rank availability of each disk unit for the storage pool and select one or more valid disk units for the storage pool according to availability ranking.

19. The system of claim 18, wherein the processor is further configured to provide one or more reasons to a user to explain validity and ranking of each disk unit.

20. The system of claim 18, wherein the storage pool is configured as a switchable storage pool.

21. The system of claim 20, further comprising one or more backup systems connected to the switchable storage pool.

22. The system of claim 20, wherein the processor is further configured to validate accessibility of disk units in the switchable storage pool when adding a node to the system.

23. The system of claim 20, wherein the processor is further configured to, when adding a switchable storage pool to the system, verify accessibility of each disk unit in the switchable storage pool by each node in the system.

24. The system of claim 23, wherein the processor is further configured to verify that a switchable entity containing the switchable storage pool is not included in another clustered system.

25. The system of claim 20, wherein the processor is further configured to switchability of the switchable storage pool when starting clustering.

* * * * *